United States Patent [19]

Yuan et al.

[11] Patent Number: 4,701,689
[45] Date of Patent: Oct. 20, 1987

[54] OPTIMAL CONTROL POWER SYSTEM STABILIZER AND METHOD USING SIMULATING STATE VARIABLES

[75] Inventors: Ren Yuan; Chen Xianzhi, both of Wuchang; Feng Yuanxi, Yichang; Li Guojiu, Wuchang; Huang Dake, Yichang; Zhang Yongli, Wuchang; Sun Quanzhong, Yichang, all of China

[73] Assignee: Huazhong Institute of Technology, Wuchang, China

[21] Appl. No.: 848,715

[22] Filed: Apr. 4, 1986

[30] Foreign Application Priority Data

Apr. 18, 1985 [CN] China .................................. 85103037

[51] Int. Cl.⁴ .............................................. H02P 9/14
[52] U.S. Cl. ..................................... 322/19; 307/102; 322/58; 361/20; 361/113
[58] Field of Search .................... 361/20, 21, 113, 111; 307/102; 322/58, 19

[56] References Cited

U.S. PATENT DOCUMENTS

| | | | |
|---|---|---|---|
| 1,376,400 | 5/1921 | Chubb | 322/58 |
| 3,916,291 | 10/1975 | Raczkowski | 322/19 |
| 4,080,559 | 3/1978 | Wright et al. | 322/58 |
| 4,377,780 | 3/1983 | Bjorklund | 361/20 |
| 4,412,171 | 10/1983 | Kaufhold | 322/58 |

FOREIGN PATENT DOCUMENTS

| | | | |
|---|---|---|---|
| 103111 | 9/1978 | Japan | 322/58 |
| 74400 | 6/1980 | Japan | 322/19 |

Primary Examiner—William H. Beha, Jr.
Attorney, Agent, or Firm—Balogh, Osann, Kramer, Dvorak, Genova & Traub

[57] ABSTRACT

The present invention relates to an automatic device for depressing low frequency oscillation of power system. It consists of an electronic circuit incorporated in the original excitation regulator of a synchronous generator. This circuit can turn the input deviation of voltage $\Delta V$ into simulating state variable deviations of angular frequency $\Delta \omega$, of power $\Delta P$ and of power angle $\Delta \delta$, and then outputs the sum of them according to the principle of optimal control. With the device of the present invention, the output capability of a remote power station may double, a whole set of measurement and feedback devices may be spared and the distortions in measurement may be avoided. The present device has further advantages of being small in size, cheap in cost, easy to establish and high in reliability.

11 Claims, 3 Drawing Figures

OPTIMAL CONTROL POWER SYSTEM STABILIZER AND METHOD USING SIMULATING STATE VARIABLES

BACKGROUND OF THE INVENTION

The present invention relates to an automatic device which can be used to depress the low frequency oscillation of a power system.

Fast excitation systems and regulators have been widely used on generators of power system to improve the operating quality and enlarge the output capability in remote power transmission. However since thyristors and other fast excitation control systems came into use, low frequency oscillation, which can affect the whole power system, might occur when the power angle of the generator reaches about 60 degree, thus becoming a technical problem of power system that needs to be solved.

In prior art, power system stabilizers (PSS) and optimal control excitation were used to depress the low frequency oscillation. If merely the measuring of voltage deviation is taken, the control effects of both measures would not be satisfactory and it is hard to depress the low frequency oscillation. Therefore, other variables that could reflect the steady state must be measured and used as additional feedback regulating variables. Generally speaking, the effect of PSS was not satisfactory while the optimal control was too complicated to realize, and both had the defects of difficult realization, distortions, low reliability, and complex measuring devices, etc.

There are many literatures and patents concerning the method of depressing the low frequency oscillation of power system, such as: USSR Pat. No. 546057, No. 410514, No. 468333, No. 449419, No. 546057, No. 658653, but none of them relate to the solution like that in the present invention.

SUMMARY OF THE INVENTION

In view of above mentioned prior methods inability to depress the low frequency oscillation of power system, the present invention proposes a simple, reliable electronic circuit which can obtain an optimal control to depress the low frequency oscillation, and raise the output of generator even to its limit while maintaining its stability.

The present invention is characterized in that the full state optimal control depresses the low frequency oscillation by using a certain state variable, e.g. the voltage deviation instead of using the complicated direct measurement of additional feedback. The state variable here means the deviation between instantaneous value of a certain parameter and its final state value e.g. $\Delta V = V(t) - V(\infty)$. All of the state variables needed to realize optimal control comes from an analog electronic circuit with voltage deviation $\Delta V$ being its input and the simulating state variables needed being its outputs. Incorporating the analog electronic circuit of the present invention in the amplifier block of the original excitation control system will depress low frequency oscillation of power systems.

DETAILED DESCRIPTION OF THE INVENTION

The electronic circuit of Type I comprises a bandpass filter circuit A with its transfer function being $$\frac{K_1}{1 + Q\left(\frac{S}{\omega_o} + \frac{\omega_o}{S}\right)},$$

an integrator circuit B with its transfer function being $$\frac{K_2}{1 + T_1 S},$$

a differential circuit C with its transfer function being $$\frac{T_2 S}{1 + T_3 S}$$

and an adder circuit D. The filter circuit A is used to transfer the voltage deviation $\Delta V$ into the angular frequency deviation $\Delta \omega$ while the integral circuit B and the differential circuit C are used to transfer the angular frequency deviation $\Delta \omega$ respectively into the power angle deviation $\Delta \delta$ and the power deviation $\Delta p$. After their coefficients are respectively regulated by corresponding potentiometers the three deviations will be added by the additor circuit D.

The electronic circuit of Type II comprises a bandpass filter circuit A with its transfer function being $$\frac{K_1}{1 + Q\left(\frac{S}{\omega_o} + \frac{\omega_o}{S}\right)},$$

which has an integral circuit B with its transfer function being $$\frac{1}{T_1 S},$$

a separate differential circuit C with its transfer function being $$\frac{T_2 S}{1 + T_3 S},$$

and a separate additor circuit D. The filter circuit A is used to transfer the voltage deviation $\Delta V$ into the angular frequency deviation $\Delta \omega$, and meanwhile through its integral circuit B to get the deviation $\Delta \delta$. The differential circuit C is used to transfer $\Delta \omega$ into the power deviation $\Delta p$. After their coefficients are respectively regulated by corresponding potentiometers, the three deviations, $\Delta \omega$, $\Delta \delta$, and $\Delta P$ are added by the additor circuit D.

The filter circuits in the electronic circuits of Type I and II, wherein the characteristic angular frequency $\omega_0$ is 1.5–2.5 times as big as the original angular frequency of low frequency oscillation $\omega_1$, and its quality factor Q being more than 5.

Figure 3:
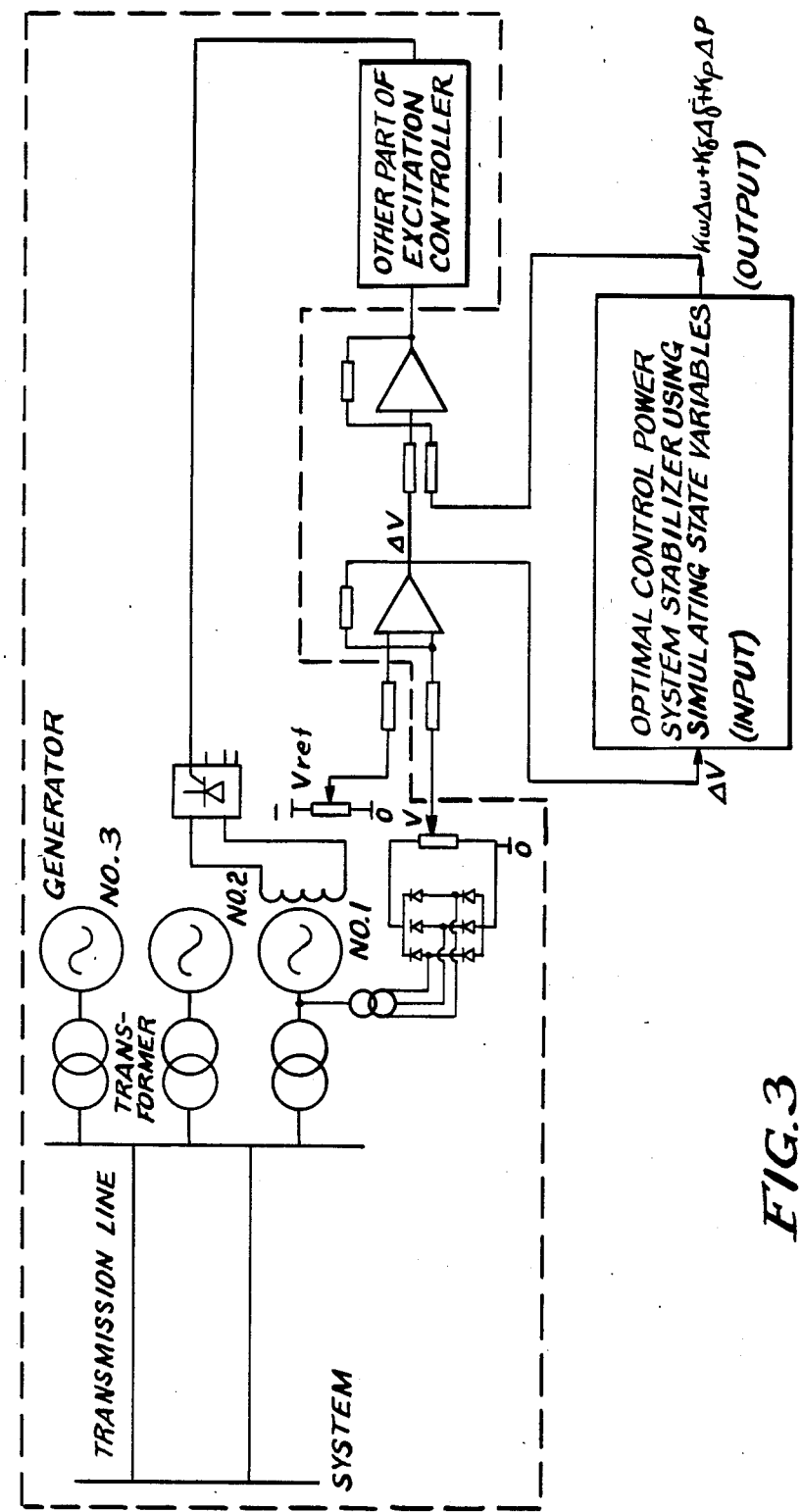
FIG. 3 is an example showing how the analog electronic circuit is connected to an original excitation device.

Both Type I and II analog circuits of simulating state variable stabilizers shown in line in FIG. 3 can be connected to every amplifier block of the original excitation system shown in dotted line in FIG. 3, thus being able to depress the low frequency oscillation of power systems. In this way, the adjustment of the original circuit can be maintained unchanged and the effect of the gain of $\Delta V$ can be considered in the coefficients of $\Delta\omega$, $\Delta\delta$ and $\Delta P$.

Figure 1:
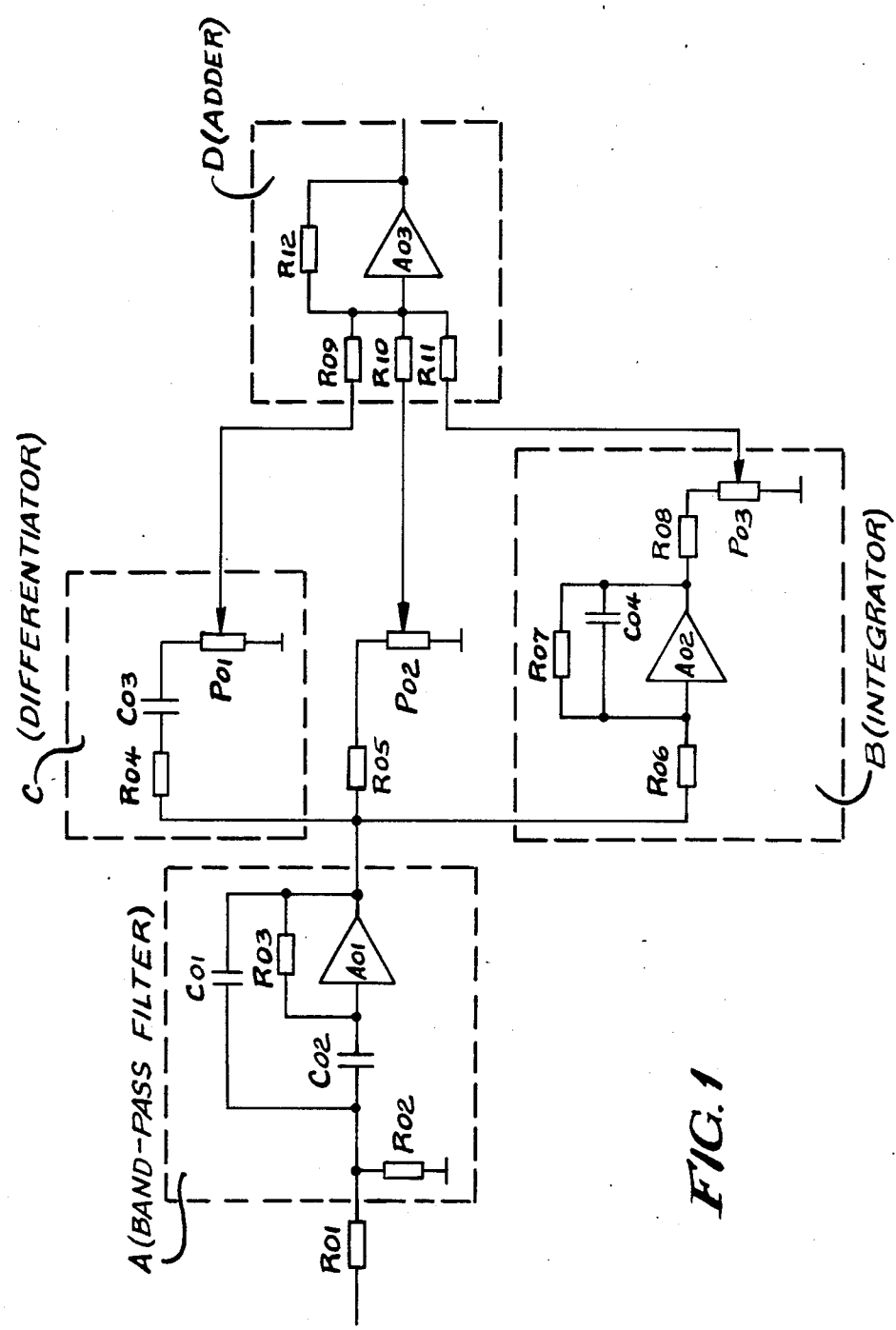
FIG. 1 is type I analog electronic circuit of simulating state variables.
Figure 2:
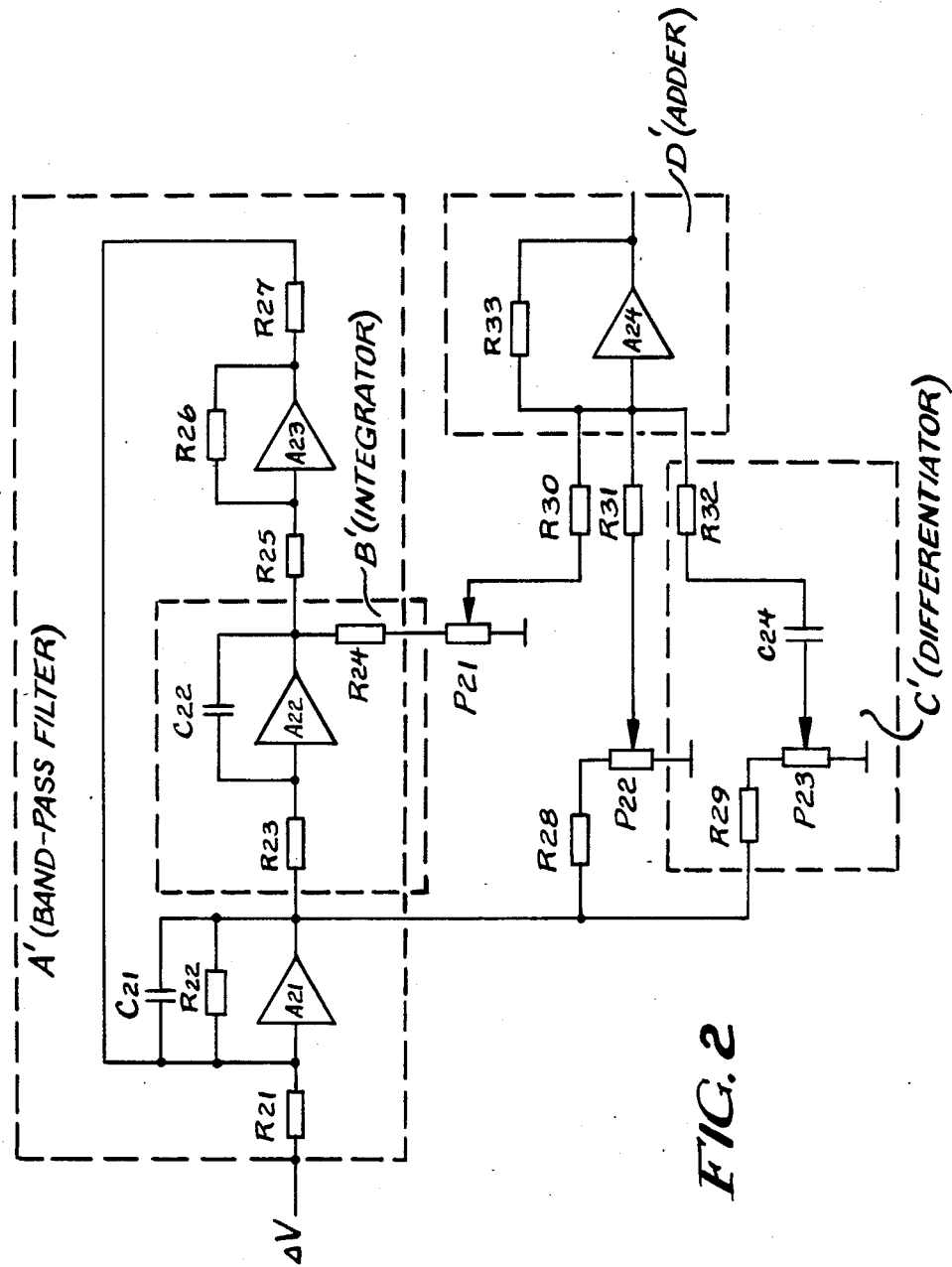
FIG. 2 is type II analog electronic circuit of simulating state variables.

After the present device was tested for more than hundreds of times in a dynamic simulation laboratory of power system according to the parameters in FIG. 1 and FIG. 2, it has been proved that in the system of two-generator to infinite system, without using the present device, the operation power angle can reach about 60°, causing the low frequency oscillation; however, with the employment of the present device, the operation power angle can be enlarged to about 110° and the output power can be almost doubled.

The present device was put into a trial operation in a hydropower plant of a capacity of 965 MW. With the use of two 141.4MVA generators having fast excitation control thyristor systems, two transformers of 150MVA, and a transmission line of 220 KV, the present device underwent an on-the-spot test by connecting the two generator-transformer sets to the system by the same but through one transmission line. The test result was completely the same with that obtained in the dynamic simulation laboratory. When the two generators generated 225 MW, of which 190 MW was sent to the system while 35 MW was local load, the local load was cut off suddenly and the waves of power in the transmission line is recorded. In this case, without the use of the present device, the alternative components of power that periodical changes every second will diverge at a time constant of 14 seconds, yet, with the use of the present device, the alternative components will converge at a time constant of 2.8 seconds.

During the test and the trial operation, the present device was compared with P.S.S. device.

The present invention has the following advantages:
1. The random disturbance effect is reduced and the quality of the power in normal operation is improved.
2. The present device is high in adaptability for when the operation mode is changed, it does not need to change its parameters while in the same case the parameters of a P.S.S. device have to be changed.
3. No additional over-voltage occurs when load is suddenly cut off.
4. The cooperation between multi-generators is fine.
5. Since the connection is very simple, the present device does not suffer any electro-magnetic disturbance, thus reliable in operation.

What is claimed:
1. An optimal control power system stabilizer using simulating state variables for installation in fast excitation control circuits to dampen low frequency oscillations comprising:
   a band-pass filter transferring the voltage deviation into the angular frequency deviation;
   at least one of an integrator transferring angular frequency deviation into a power angle deviation and a differentiator for transferring angular frequency deviation into power deviation; and
   adder means for summing the angular frequency deviation and at least one of the other deviations.

2. An optimal control power system stabilizer according to claim 1, including:
   a second-order band-pass filter having an input for receiving a voltage deviation and an output for delivering angular frequency deviation;
   an integrator having an input connected to the output of said second-order band-pass filter and an output for delivering the power deviation;
   a differentiator having an input connected to the output of said second-order band-pass filter and an output for delivering power deviation;
   said adder means having three inputs connected to the outputs of said band-pass filter, said integrator and said differentiator, respectively.

3. An optimal control power system stabilizer according to claim 2, further including:
   a potential regulator connected between the output of said band-pass filter and the first input of said adder means;
   a potential regulator connected between the output of said integrator and the second input of said adder means; and
   a potential regulator connected between the output of said differentiator and the third input of said adder means, for adjusting the coefficients of angular frequency deviation, power angle deviation, and power deviation, respectively, to achieve the optimal control effect.

4. An optimal control power system stabilizer according to claim 1, including:
   a second-order band-pass filter, an integrator having an input for receiving voltage deviation, an output for delivering angular frequency deviation, and an output for delivering power angle deviation;
   a differentiator having an input connected to the output for delivering angular frequency deviation of said second-order band-pass filter, and an output for delivering power deviation;
   said adder means having three inputs connected to the two outputs of said second-order band-pass filter and the output of said differentiator, respectively.

5. A optimal control power system stabilizer according to claim 4 further including a potential regulator connected between one output of said band-pass filter and the input of said adder means, a potential regulator connected between another output of said band-pass filter and the second input of said adder means, and a potential regulator associated with said differentiator for adjusting the coefficients of angular frequency deviation, power angle deviation, and power deviation, respectively, to achieve the optimal control effect.

6. An optimal control method utilized in fast control circuits to dampen the low frequency oscillations, including the steps of:
   measuring the voltage and obtaining the voltage deviation;
   transferring voltage deviation into angular frequency deviation with a second-order band-pass filter;
   transferring angular frequency deviation into power angle deviation by means of an integrator and into power deviation by means of a differentiator;
   summing angular frequency deviation and at least one of the other deviations by means of an adder; and
   controlling the generator excitation with voltage deviation as well as angular frequency deviation and at least one of power angle deviation and power deviation.

7. An optimal control method using simulating variables according to claim 6, including the steps of:
utilizing a second-order band-pass filter for transferring voltage deviation into angular frequency deviation;
connecting the output delivering angular frequency deviation from said second-order filter to the input of said integrator and the input of said differentiator; and
connecting the output delivering angular frequency deviation from said second-order band-pass filter, the output delivering power angle deviation from said integrator, and the output delivering power deviation from said differentiator to the three inputs of said adder means, respectively.

8. An optimal control method using simulating variables according to claim 7, further including the steps of adjusting the coefficients of angular frequency deviation, power angle deviation, and power deviation, respectively, to achieve the optimal control effect by controlling a potential regulator connected between said second-order band-pass filter and the first output of said adder means, a potential regulator connected between the output of said integrator and the second input of said adder means, and a potential regulator connected between the output of said differentiator and the third input 9. An optimal control method using simulating variables according to claim 6, including the steps of:
utilizing a second-order band-pass filter with an integrator for transferring voltage deviation into angular frequency deviation and power angle deviation simultaneously;
connecting the output of angular frequency deviation from said second-order band-pass filter to the input of said differentiator; and
connecting the output of voltage deviation and the output of power angle deviation of said second-order band-pass filter and the output of power deviation from said differentiator to the three inputs of said adder means, respectively.

10. An optimal control method using simulating state variables according to claim 9, further including the steps of adjusting the coefficients of angular frequency deviation, power angle deviation, and power deviation, respectively, to achieve the optimal control effect by controlling a potential regulator connected between the output delivering angular frequency deviation from said second-order band-pass filter and the first input of said adder means, a potential regulator connected between the output delivering power angle deviation of said second-order band-pass filter and the second input of said adder means, and a potential regulator included in said integrator.

11. A control method utilized in fast excitation control circuits to dampen the low frequency oscillations including the steps of:
measuring a voltage and obtaining a voltage deviation;
converting said voltage deviation into an angular frequency deviation with a band-pass filter; and
controlling generator excitation with the angular frequency deviation and voltage deviation.

* * * * *